United States Patent [19]

Wigren et al.

[11] Patent Number: 5,598,506
[45] Date of Patent: Jan. 28, 1997

[54] APPARATUS AND A METHOD FOR CONCEALING TRANSMISSION ERRORS IN A SPEECH DECODER

[75] Inventors: Karl T. Wigren, Uppsala; Rolf A. Bergström, Mölndal, both of Sweden

[73] Assignee: Telefonaktiebolaget LM Ericsson, Stockholm, Sweden

[21] Appl. No.: 258,579

[22] Filed: Jun. 10, 1994

[30] Foreign Application Priority Data

Jun. 11, 1993 [SE] Sweden ................................. 9302025

[51] Int. Cl.$^6$ ................................. G10L 5/06; G10L 9/00
[52] U.S. Cl. ......................................... 395/2.42; 395/2.37
[58] Field of Search .............................. 395/2.35, 2.36, 395/2.42, 2.37; 371/36, 48, 54

[56] References Cited

U.S. PATENT DOCUMENTS

| | | | |
|---|---|---|---|
| 4,153,877 | 5/1979 | Fathauer et al. | 325/25 |
| 4,656,633 | 4/1987 | Todd | 371/54 |
| 4,660,196 | 4/1987 | Gray et al. | 370/109 |
| 4,802,171 | 1/1989 | Rasky | 395/2.36 |
| 4,918,729 | 4/1990 | Kudoh | 381/36 |
| 5,097,507 | 3/1992 | Zinser et al. | 395/2.35 |
| 5,142,582 | 8/1992 | Asakawa et al. | 381/36 |
| 5,271,011 | 12/1993 | McMullan et al. | 371/5.3 |
| 5,432,778 | 7/1995 | Minde et al. | 370/95.3 |
| 5,459,814 | 10/1995 | Gupta et al. | 395/2.42 |
| 5,485,522 | 1/1996 | Solve et al. | 381/56 |
| 5,502,713 | 3/1996 | Lagerqvist et al. | 370/17 |

FOREIGN PATENT DOCUMENTS

| 0522213 | 9/1993 | European Pat. Off. | G10L 3/00 |
|---|---|---|---|

OTHER PUBLICATIONS

L. R. Rabiner, "Applications of Voice Processing to Telecommunications", Proc. IEEE, vol. 82, No. 2, pp. 199–228.
International Publication No. WO89/08910.
J. G. Proakis, "Digital Communication", 2nd Ed, McGraw–Hill, 1989 pp. 220–234, 362–365, and 593–624.
G. C. Clark et al., "Error Correction Coding for Digital Communication," Plenum Press 1981, pp. 1–17, 49–53, 73–75 and 227–235.
T. B. Minde et al., "Techniques for Low Bit Rate Speech Coding Using Long Analysis Frames", ICASSP, Minneapolis, USA, 1993.
B. S. Atal et al., "Advances in Speech Coding", Kluwer Academic Publishers, 1991 pp. 69–79.
"Voice Activity Detection", Recommendation GSM 06.32, ETSI/GSM, 1991.
IEE colloquium od 'Terrestrial DAB—Where is it going', p. 3/1–8, Plange et al., "Combined channel coding and concealment". Feb. 1993.
IEEE transactions on communications, vol. 37 Issue 3, Bryden et al., "Error correction/masking for digital voice transmission over the land mobile satellite system", pp. 309–341. Mar. 1989.
ICASSP '89: Acoustics, Speech and Signal processing conference, Kobatake et al., "Speech/Nonspeech discrimination for speech recognition system under real life noise environments", pp. 365–368. Jan. 1989.
IEE Colloq. (1988) No. 139: Digitized Speech Communication via Mobile Radio, Freeman et al., "A voice activity detector for the pan–European digital cellular mobile telephone service", pp. 6/1—6/5. Jan. 1988.

*Primary Examiner*—Allen R. MacDonald
*Assistant Examiner*—Richemond Dorvil
*Attorney, Agent, or Firm*—Burns, Doane, Swecker & Mathis, L.L.P.

[57] ABSTRACT

A receiver in a frame based radio communication system includes a speech decoder of the source-filter type which is controlled by internal state variable updated on a frame by frame basis for modifying received filter parameters representing background sounds transmitted over a communication channel. The receiver detects frames containing transmission errors, decides whether a frame in which transmission errors have been detected is acceptable, and conceals the detected transmission errors by restricting updating of at least one of the internal state variables if the detected frame is declared non-acceptable.

26 Claims, 1 Drawing Sheet

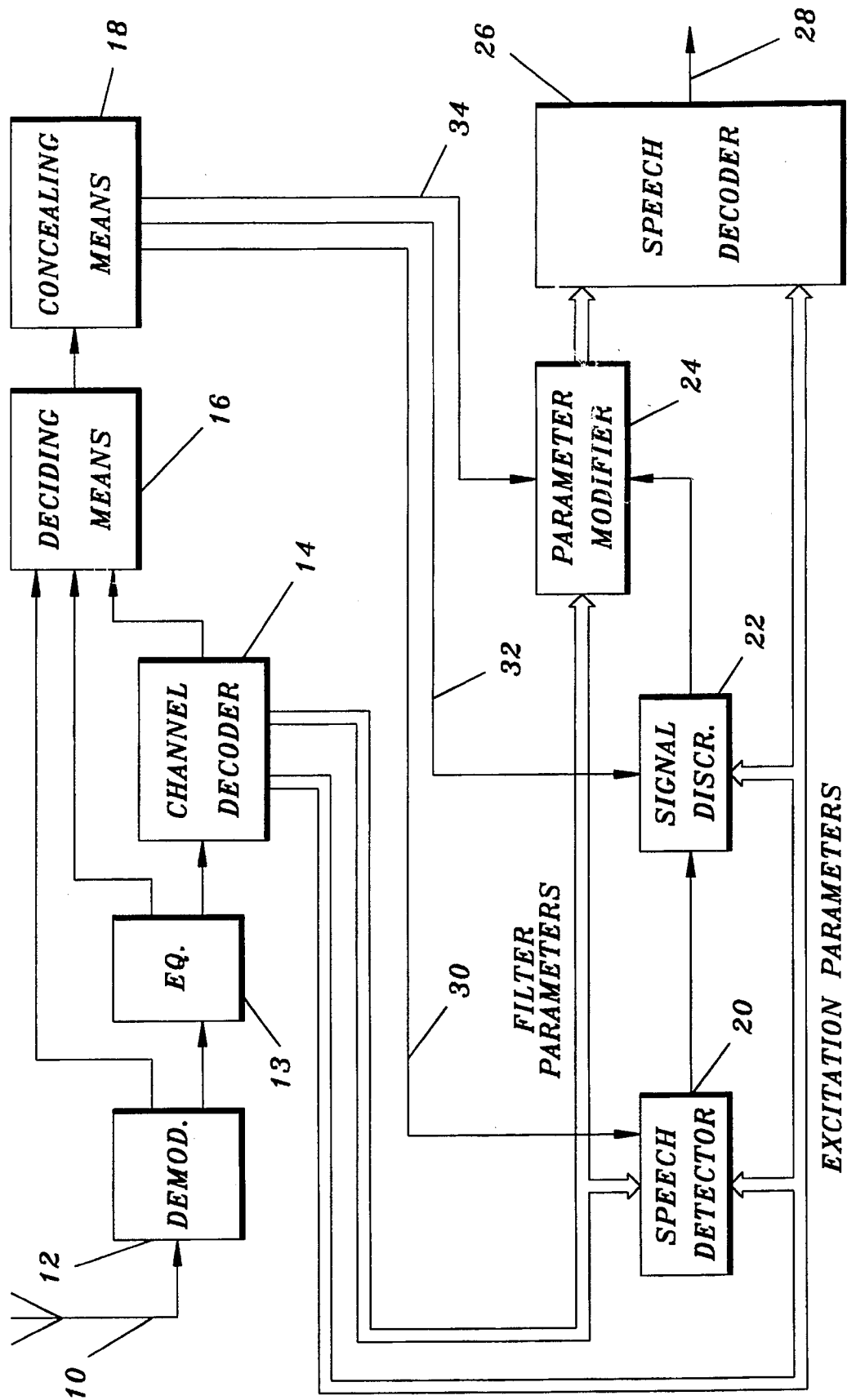

1

APPARATUS AND A METHOD FOR CONCEALING TRANSMISSION ERRORS IN A SPEECH DECODER

TECHNICAL FIELD

The present invention relates to transmission error concealment in a radio communication system, and specifically to an apparatus and a method for improving decoding of background sounds in such a system.

BACKGROUND OF THE INVENTION

Means for improving encoding/decoding of background sounds, primarily intended for digital cellular telephone systems, have been described in Swedish Patent Applications 93 00290-5 and 93 01798-6. These means are primarily designed to handle a situation where the connection between the speech encoder and the speech decoder is close to ideal, in the sense that only a small amount of bit or transmission errors remain after channel decoding. However, since the connection is a radio channel the received signal may contain some bit or transmission errors. In such a case it may be necessary to modify the methods described in the above Swedish patent applications.

An object of the present invention is an apparatus and a method in which so called error concealment is applied to the received signal in order to make the speech decoding more robust or insensitive to transmission errors.

SUMMARY OF THE INVENTION

In accordance with the invention this object is solved by an apparatus in a receiver in a frame based radio communication system, for concealing transmission errors in a speech decoder caused by a communication channel, which speech decoder is of the source-filter type and is controlled by means including internal state variables updated on a frame by frame basis for modifying received filter parameters representing background sounds transmitted over said communication channel, said apparatus comprising:

(a) means for detecting frames containing transmission errors;

(b) means for deciding whether a frame in which transmission errors have been detected is acceptable;

(c) means for concealing said detected transmission errors by restricting updating of at least one of said internal state variables if said detected frame is declared non-acceptable by said deciding means.

Furthermore, in accordance with the invention the above object is also solved by a method in a receiver in a frame based radio communication system, for concealing transmission errors in a speech decoder caused by a communication channel, which speech decoder is of the source-filter type and comprises means including internal state variables updated on a frame by frame basis for modifying received filter parameters representing background sounds transmitted over said communication channel, said method comprising:

(a) detecting frames containing transmission errors;

(b) deciding whether a frame in which transmission errors have been detected is acceptable;

(c) concealing said detected transmission errors by restricting updating of at least one of said internal state variables if said detected frame is declared non-acceptable in said deciding step.

BRIEF DESCRIPTION OF THE DRAWING

The invention, together with further objects and advantages thereof, may best be understood by making reference to the following description taken together with the accompanying drawing, which is a schematic block diagram of the relevant parts of a receiver in a radio communication system containing an apparatus in accordance with the present invention.

DETAILED DESCRIPTION OF THE PREFERRED EMBODIMENTS

To understand the operation of the invention it is useful to briefly review the operation of a typical digital cellular radio connection, typical error concealment techniques, and also to review the algorithms of the above mentioned Swedish patent applications.

In a communication link of a digital cellular telephone system the acoustic signal is first digitized and then a speech coding algorithm is applied (see for example B. S. Atal, V. Cuperman and A. Gersho, eds, "Advances in Speech Coding", Kluwer Academic Publishers, 1991). This algorithm compresses the speech signal and transforms it to a number of quantized parameters (usually in a frame based manner). The resulting bits are thereafter protected by addition of coding redundancy, using channel encoding techniques (see for example G. C. Clark and J. B. Cain, "Error Correction Coding for Digital Communication", Plenum Press, 1981). The resulting bit stream is then modulated (see for example J. G. Proakis, "Digital Communication", 2nd edition McGraw-Hill, 1989) and transmitted, for example using TDMA (Time Division Multiple Access) techniques. At the receiver the signal is demodulated. Possible time or multipath dispersion can be countered by various equalization techniques, for example Viterbi equalization or decision feedback equalization (see for example the reference by J. G. Proakis above). Channel decoding (see for example the reference by G. C. Clark and J. B. Cain above) is then used in order to decode the bits that form the quantized parameters that the speech decoder needs in order to reconstruct the transmitted speech signal. It is clear from the above discussion that disturbances on the transmission channel can affect the reconstructed speech signal, thus reducing the quality of that signal.

Although channel encoding/decoding techniques can reduce the sensitivity to disturbances significantly, it is usually not enough to apply only channel coding in a digital cellular system. On the contrary, it is quite common to additionally use so called error concealment techniques in order to further mask the perceptual effects of bit errors remaining at the input of the speech decoder. These techniques all rely on some information on the quality of the transmission channel, which information is available or estimated at the receiving end. When such information indicates that the quality of the transmission channel is poor, the error concealment techniques initiate special actions in the speech decoder, with the purpose of reducing the negative effects of bit errors on the reconstructed speech signal. The level of sophistication of the error concealment techniques is dependent on the character of the information on the quality of the transmission channel. A few ways to obtain such information will now be described.

Direct information on the channel quality can be obtained by measuring the signal strength. A low value would then indicate a low signal to noise ratio, which means that the channel quality can be expected to be poor. Channel coding techniques provide a further level of sophistication. One type of technique is to use redundant channel coding, e.g. Cyclic Redundancy Check (CRC) (see for example the reference by G. C. Clark and J. B. Cain above), in particular when the code is used for error detection. Moreover, "soft" (not binary quantized) information may be obtained from the convolutional decoder (in case a convolutional code is used), demodulator, equalizer, and/or block code decoder (see for example the reference by J. G. Proakis above). One technique that often is applied is to divide the information bits from the speech encoder into different classes, each with different error correction/detection schemes, thereby reflecting different importance of different bits (see for example "TR-45 Full Rate Speech Codec Compatibility Standard PN-2972", Electronic Industries Association, 1990 (IS-54)). Hence, parts of the information with error detection/correction codes applied may be used as indicators of possible bit errors present in the speech frame.

Some techniques to introduce error concealment in conventional speech decoders with the intention of masking frames that are considered to contain bit errors will now be briefly described. When a bad frame is detected, it is common to use the information from the previous accepted frame. Often this technique is combined with muting (reduction of output level) in case the bad frame situation should persist for several frames (see for example "TR-45 Full Rate Speech Codec Compatibility Standard PN-2972", Electronic Industries Association, 1990 (IS-54)). This situation is not unusual in mobile telephone systems, where fading dips can persist for quite long periods of time in cases where the mobile velocity is low. The result of muting is that disturbances are masked in the reconstructed signal. In particular loud "clicks" are avoided. When more detailed information is available on the quality of each received part of incoming bits, it becomes possible to trace down possible transmission errors to certain parameters of the speech decoder. Since said parameters model different phenomena of speech, error concealment techniques can be developed that are optimized to the physical meaning of each particular parameter. One particular example of this is the so called pitch gain (see for example T. B. Minde et al., "Techniques for low bit rate speech coding using long analysis frames", ICASSP, Minneapolis, USA, 1993). A value larger than one is sometimes needed for this parameter during transient periods of speech. Such a value does, however, correspond to an unstable filter model, which means that it may be somewhat dangerous to use it. In particular, it is suitable to introduce error concealment techniques that limit the pitch gain to values less than one whenever a possible bit error in that parameter is detected. A further example is the spectral filter model that is commonly used in modern speech coding algorithms (see for example the reference by T. B. Minde et al. above). In that case error concealment techniques can be used in order to prevent the use of unstable filters when bit errors are indicated in the corresponding spectral information. The reverse is also of relevance; whenever an unstable filter is detected, a bad frame may be indicated and error concealment techniques may be applied.

With this background information in mind, the present invention will now be described with-reference to FIG. 1. FIG. 1 shows the parts of a receiver in a mobile radio communication system necessary to describe the present invention. An antenna 10 receives the transmitted signal and forwards it to a demodulator 12. Demodulator 12 demodulates the received signal and forwards it to an equalizer 13, for example a Viterbi-equalizer, which converts the received and demodulated signal into one or several bit streams, which are forwarded to a channel decoder 14. Demodulator 12 and equalizer 13 also forward "soft" information on received bits or symbols to a deciding means 16. Channel decoder 14 converts the bit stream into a filter parameter stream and an excitation parameter stream for speech decoding. Furthermore, channel decoder 14 performs cyclic redundancy check (CRC) decoding on at least parts of each received frame. The results of these checks are forwarded to deciding means 16.

The receiver also contains a speech detector 20 (also called voice activity detector or VAD). Speech detector 20 determines from said filter and excitation parameters whether the received frame contains primarily speech or background sounds. The decision of speech detector 20 is forwarded to a signal discriminator 22, which uses some of the excitation parameters to determine whether received signals representing background sounds are stationary or not. If a frame is declared as containing stationary background sounds, the output of signal discriminator 22 controls a parameter modifier 24 to modify the received filter parameters. This modification is described in detail in Swedish Patent Application 93 00290-5. The modification may be performed by the parameter modifier 24 in several ways. One possible modification is a bandwidth expansion of the filter. This means that the poles of the filter are moved towards the origin of the complex plane. Another possible modification is low-pass filtering of the filter parameters in the temporal domain. That is, rapid variations of the filter from frame to frame are attenuated by low-pass filtering at least some of the parameters. Furthermore, the stationarity detection of signal discriminator 22 and the interaction between speech detector 20, signal discriminator 22 and parameter modifier 24 is described in detail in Swedish Patent Application 93 01798-6. The possibly modified filter parameters (if the received signal represents stationary background sounds) and the excitation parameters are forwarded to a speech decoder 26, which outputs a sound signal on output line 28.

In order to describe the error concealment techniques of the present invention it is necessary to briefly describe the effect of bit errors on the so called anti-swirling algorithms that are described in the above two Swedish patent applications. These effects can be divided roughly as follows:

1. Voice activity or speech detector 20 that is used to control the anti-swirling algorithm is usually adaptive ("Voice Activity Detection", Recommendation GSM 06.32, ETSI/GSM, 1991). This means that there are thresholds and corresponding states that are automatically updated internally in the voice activity detector, using either a measured speech signal or, when applied in the receiver as is assumed here, decoded parameters from the channel decoder. When there are errors in the incoming parameters this leads to thresholds or internal state variables that are not updated correctly, which may result in erroneous decisions. The result would be a reduced quality of the reconstructed audio signal.

2. Voice activity or speech detector 20 forms its speech/back-ground sound decision Using incoming filter and excitation parameters and also internally updated states, i.e. old incoming parameters and additional a priori information. Bit errors may therefore result in immediate erroneous decisions in the receiver, which leads to reduced quality of the reconstructed audio signal. Furthermore, since the current decision also depends on old incoming parameters, bit errors may also influence future decisions.

3. Signal discriminator 22, which is a part of the system in a preferred embodiment of the present invention, investigates incoming statistical moments, preferably energy values that describe the average signal energy for each frame. It needs to store a large number of these energies, both for the current frame and for older frames in one or several buffers (details are described in the above Swedish Patent Application 93 01798-6). Should there be errors in these incoming energies, these errors will also be stored in the buffers causing erroneous decisions for a significant amount of time. The result would be a reduced quality of reconstructed background sound signals.

4. The actions that are used in order to counter swirling in case of a stationary background sound signal suffer in several ways when an erroneous decision caused by bit errors occurs. One effect is that speech is destroyed when a stationary background sound is erroneously detected and the anti-swirling actions are initiated. The opposite erroneous decision (speech when there is actually a stationary background sound present) can also occur, and therefore the character of the background sound is changed momentarily, which can be rather annoying. Repeated switching between decisions indicating speech/-stationary background sounds is also undesirable, since time constants are in effect during the transition between the two states. Should excessive switching take place because of bit errors, this would be very disturbing.

5. The actual anti-swirling actions in parameter modifier 24 (essentially spectral low pass filtering in combination with bandwidth expansion, as explained in detail in the above Swedish Patent Application 93 00290-5) suffer from bit errors. One effect occurs because of erroneous decisions from speech or voice activity detector 20 or from signal discriminator 22. In these cases the updating of the low pass filter may be initiated or turned off, causing a deviation as compared to the case of a perfect channel. Another effect occurs when there are bit errors affecting the spectral information that feeds the low pass filters and the bandwidth expansion. Both these effects may cause quality reductions.

6. A postfilter of speech decoder 26 (whenever present) has similar problems as described in section 5. above. Furthermore, the so called spectral tilt is perceptually very sensitive, and since it may be manipulated by the anti-swirling algorithm, bit errors can give a significant quality reduction of the reconstructed speech signal.

7. The effects described above may combine and influence each other. For example an erroneous decision in speech detector 20 may result in stopped updating of buffers of signal discriminator 22. This in turn will influence signal discriminator 22 for a significant period of time, causing reduced quality of the anti-swirling actions.

From the above discussion it is clear that transmission errors can result in incorrect updating of internal variables of speech detector 20, signal discriminator 22, parameter modifier 24 or combinations thereof. In accordance with the present invention these problems are reduced or eliminated by modifying the updating process during frames in which transmission errors have been detected. This modified updating will now be described more in detail.

Deciding means 16 receives "soft" information on the reliability of bits from demodulator 12 and equalizer 13, and the results of CRC-checks from channel decoder 14. Deciding means 16 then determines whether bit errors have occurred or are likely (from the "soft information"). Furthermore, it is decided whether possible bit errors influence the filter or excitation parameters. If this is the case, and if these bit errors occur in parameters that significantly influence the operation of speech detector 20, signal discriminator 22 or parameter modifier 24, a corresponding signal is forwarded to concealing means 18. This can for instance be the case if the parameter corresponding to the frame energy contains one or more bit errors.

Depending on the parameter that contains bit errors, concealing means 18 can control the operation of the updating process of corresponding internal state variables in speech detector 20, signal discriminator 22 and parameter modifier 24, as indicated by control lines 30, 32 and 34, respectively. These modifications include:

Stopping updating of internal state variables (for example thresholds) of speech detector 20 when a bad frame is detected. This implies that the internal variables of speech detector 20 are locked to the same value as in the previous frame, or that the updating of these state variables is restricted (state variables can only be updated by smaller amounts than usual).

Another action is to lock the decision in speech detector 20 to the decision from the previous frame in case a non-acceptable frame containing transmission errors is detected.

If a non-acceptable frame containing transmission errors in excitation parameters that are relevant for stationarity decisions has been detected, the updating of the buffers in signal discriminator 22 can be stopped or restricted.

Another possibility is to lock the decision of signal discriminator 22 to the decision of the previous frame.

If the received frame contains transmission errors in bits containing spectral information the updating of internal filter coefficients of parameter modifier 24 controlling low pass filtering and/or bandwidth expansion can be stopped or restricted.

The spectral tilt of a possible post filter can be locked to the tilt of the previous frame.

Since different received parameters influence different blocks in FIG. 1 (speech detector 20, signal discriminator 22, parameter modifier 24 and a possible postfilter), it is appreciated that one or several of these actions can be taken, depending on where in the received frame the bit errors have been detected.

In the above discussion it is also appreciated that if transmission errors occur in a certain received parameter for consecutive frames, the corresponding internal state variable of the corresponding block of the receiver will be locked to (or essentially locked to) its value in the latest received frame in which the corresponding parameter was correctly received.

A preferred embodiment of the method in accordance with the present invention is illustrated in detail by the two PASCAL program modules in the attached APPENDIX.

It will be understood by those skilled in the art that various modifications and changes may be made to the present invention without departure from the spirit and scope thereof, which is defined by the appended claims.

12

APPENDIX

```
[INHERIT ('spd$def')]
MODULE vad_dtx_rx (input,output);

CONST nr_sub_blocks    =    4;
            nr_acf_lags_in   =   10;
            nr_acf_lags_used =    8;
            burstconst       =    3;
            hangconst        =    5;
            frames_av0       =    4;

VAR adaptcount         : [STATIC] INTEGER;   { For threshold }
            thvad              : [STATIC] DOUBLE;    { For threshold }
            rvad               : [STATIC] ARRAY [0..nr_acf_lags_used]
                                         OF REAL;
            burstcount         : [STATIC] INTEGER;   { For overhang }
            hangcount          : [STATIC] INTEGER;   { For overhang }
            n                  : [STATIC] ARRAY [-1..nr_sub_blocks-1]
                                         OF INTEGER;
            last_dm            : [STATIC] REAL;      { For VAD }
            old_lag_count      : [STATIC] INTEGER;
            very_old_lag_count : [STATIC] INTEGER;
            thresh             : [STATIC] REAL;
            lthresh            : [STATIC] INTEGER;
            nthresh            : [STATIC] INTEGER;

acf_old,av0        : [STATIC] ARRAY [-frames_av0..0,
                                                 0..nr_acf_lags_used]
                                         OF REAL;
            aav1,rav1,av1      : [STATIC] ARRAY [0..nr_acf_lags_used]
                                         OF REAL;
```

13

```
    elapsed_frames    : [STATIC] INTEGER;
    sp_hangover       : [STATIC] INTEGER;
    speech_dtx        : [STATIC] BOOLEAN;

sp_old            : [STATIC] BOOLEAN;

PROCEDURE schur_pas ( acf : ARRAY [A1..A2:INTEGER] OF REAL;
                      VAR rc : ARRAY [B1..B2: INTEGER] OF
                               REAL;
                      mdim   : INTEGER ); EXTERNAL;

PROCEDURE stepup_pas ( rc   : ARRAY [A1..A2:INTEGER] OF REAL;
                       VAR a : ARRAY [B1..B2:INTEGER] OF
                               REAL;
                       mdim   : INTEGER ); EXTERNAL;

PROCEDURE Flstat_det_rx ( pow   : REAL;
                          sp_1 : BOOLEAN;
                          VAR sp : BOOLEAN); EXTERNAL;

PROCEDURE Flstat_det_rx_init; EXTERNAL;

[GLOBAL]
PROCEDURE FLvad_init;           { MUST be called from start}

VAR
        i,j    : INTEGER;

BEGIN

{ threshold } adaptcount := 0;
    thvad := 1000000;
    rvad[0] := 6;
    rvad[1] := -4;
```

```
                                    14
    rvad[2] := 1;
    FOR i := 3 TO nr_acf_lags_used DO BEGIN
        rvad[i] := 0;
    END;

{ end threshold }

{ vad } old_lag_count := 0;
    very_old_lag_count := 0;
    n[3] := 19;
    hangcount := -1;
    burstcount := 0;
    last_dm := 0;
    thresh := 0.05;

lthresh := 2;
    nthresh := 4;

FOR i := -frames_av0 TO -1 DO BEGIN
        FOR j := 0 TO nr_acf_lags_used DO BEGIN
            acf_old[i,j] := 0;
            av0[i,j] := 0;
        END;
    END;

{ end vad } elapsed_frames := 24;
    sp_hangover := 0;
    speech_dtx := TRUE;
    sp_old := TRUE;
    Flstat_det_rx_init;
END;    { init_vad_dtx }

PROCEDURE vad_thresh (
```

```
                    15
            acf0 : REAL;                    {  Input  }
            rav1 : ARRAY [A1..A2: INTEGER]
                   OF REAL;                 {  Input  }
            stat : BOOLEAN;                 {  Input  }
            ptch : BOOLEAN;                 {  Input  }
            pvad : DOUBLE                   {  Output }
        );

{ Common variables used:    ( all output )

adaptcount    initially set to        0
     thvad         initially set to  1000000
      rvad          initially set to   rvad[0] :    6
                                       rvad[1] :   -4
                                       rvad[2] :    1
                                       rvad[3-8] :  0  }

CONST pth     =    300000;
     plev    =    800000;
     fac     =         3;
     adp     =         8;
      inc    =        16;
      dec    =        32;
     margin  = 80000000;

VAR i      : INTEGER;

BEGIN

IF acf0 < pth  THEN BEGIN
        thvad := plev;
```

```
                              16
END ELSE BEGIN

IF NOT (stat AND NOT ptch) THEN BEGIN
              adaptcount := 0;
        END ELSE BEGIN
              adaptcount := adaptcount +1 ;
              IF adaptcount >  adp THEN BEGIN
                   thvad := thvad - thvad / dec;
                   IF thvad < pvad*fac THEN BEGIN
                        thvad := MIN (
                             thvad +thvad/inc,
                             pvad*fac);
                   END;

IF thvad > pvad+margin THEN BEGIN
                        thvad := pvad +  margin;
                   END;

FOR i := 0 TO nr_acf_lags_used DO
                                              BEGIN
                        rvad[i] := rav1[i];
                   END;

adaptcount := adp + 1;
              END;
         END;
      END;
END;    { Procedure }

PROCEDURE FLvad_rx_1 (
             acf_in : realACFType;              { Input }
             ltp_lags : integersubframeltptype;  { Input }
             VAR  vad : BOOLEAN);                { Output }

{ Common variables used:

n[-1..3]             : ltp_lags   Input/Output
```

```
                    17
       oldlagcount           :              Input/Output
       veryoldlagcount       :              Input/Output
       thvad                 : threshold  }

VAR ptch,
       vvad,
       stat                  : BOOLEAN;
       lag_count,
       smallag,
       i,j,k                 : INTEGER;
       acf0,
       dm,difference         : REAL;
       pvad                  : DOUBLE;
       rc                    : ARRAY [1..nr_acf_lags_used]
                                OF REAL;

BEGIN n[-1] := n[3];
    FOR i := 0 TO 3 DO BEGIN
          n[i] := ltp_lags[i];
    END;

FOR i := -frames_av0 TO -1 DO BEGIN
          FOR k := 0 TO nr_acf_lags_used DO BEGIN
                acf_old[i,k] := acf_old[i+1,k];
                av0[i,k] := av0[i+1,k];
          END;
    END;

FOR k := 0 TO nr_acf_lags_used DO BEGIN
          acf_old[0,k] := acf_in[k];
```

```
                              18
END;

{ Adaptive filtering and energy computation. } pvad := rvad[0] * acf_old[0,0];
FOR k := 1 TO nr_acf_lags_used DO BEGIN
      pvad := pvad + 2.0 * rvad[k] * acf_old[0,k];
END;

{ ACF averaging }

FOR k := 0 TO nr_acf_lags_used DO BEGIN
      av0[0,k] := 0;
      FOR j := 0 TO frames_av0-1 DO BEGIN
            av0[0,k] := av0[0,k] + acf_old[-j,k];
      END;
      av1[k] := av0[-frames_av0,k];
END;

{ Solve the equations system }
schur_pas (av1,rc,nr_acf_lags_used);
stepup_pas (rc,aav1,nr_acf_lags_used);

FOR i := 0 TO nr_acf_lags_used DO BEGIN
      rav1[i] := 0;
      FOR k := 0 TO nr_acf_lags_used-i DO BEGIN
            rav1[i] := rav1[i] + aav1[k] * aav1[k+i];
      END;
END;

IF av0[0,0] <= 0 THEN BEGIN
      dm := 0;
END ELSE BEGIN
      dm := rav1[0] * av0[0,0];
      FOR i := 1 TO nr_acf_lags_used DO BEGIN
            dm := dm+ 2*rav1[i]*av0[0,i];
      END;
```

```
                            19
        dm := dm/av0[0,0];
END;

difference := dm - last_dm;
stat := ABS(difference) < thresh;
last_dm := dm;
ptch := ((old_lag_count+very_old_lag_count) >=nthresh );
acf0 := acf_in[0];
vad_thresh (acf0,rav1,stat,ptch,pvad);
vvad := (pvad>thvad);
IF vvad THEN BEGIN
      burstcount := burstcount + 1;
END ELSE BEGIN
      burstcount := 0;
END;

IF burstcount >= burstconst THEN BEGIN
      hangcount := hangconst;
      burstcount := burstconst;
END;

vad := vvad OR (hangcount >= 0);

IF hangcount >= 0 THEN BEGIN
      hangcount := hangcount -1;
END;

lag_count := 0;

FOR j := 0 TO 3 DO BEGIN
      IF n[j] > 19 THEN BEGIN
            smallag := MAX(n[j],n[j-1]) MOD
                        MIN(n[j],n[j-1]);
            IF MIN(smallag,MIN(n[j],n[j-1])-smallag) <
               lthresh THEN BEGIN
                  lag_count := lag_count + 1;
            END;
```

```
                            20
        END;
    END;

very_old_lag_count := old_lag_count;
    old_lag_count := lag_count;

END;

PROCEDURE FLdtx_hand_rx_1 (    vad : BOOLEAN;           { Input }
                           VAR  sp : BOOLEAN);          { Output }

BEGIN

IF elapsed_frames < 24 THEN BEGIN
        elapsed_frames := elapsed_frames + 1;
    END;

IF speech_dtx THEN BEGIN

IF vad THEN BEGIN
            sp := TRUE;
        END ELSE BEGIN
            sp_hangover := 1;
            IF elapsed_frames = 23 THEN BEGIN
                elapsed_frames := 22;
            END;
            sp := (elapsed_frames > 23);
            speech_dtx := FALSE;
        END;
    END ELSE BEGIN
        IF vad THEN BEGIN
            sp := TRUE;
            speech_dtx := TRUE;
        END ELSE BEGIN
```

```
                        21
        IF sp_hangover < 5 THEN BEGIN
            sp_hangover := sp_hangover + 1;
            IF elapsed_frames = 23 THEN BEGIN
                elapsed_frames := 22;
            END;
        END;
        IF sp_hangover > 4 THEN BEGIN
            elapsed_frames := 0;
            sp := FALSE;
        END ELSE BEGIN
            sp := (elapsed_frames > 23);
        END;
      END;
   END;
END;

[GLOBAL]
PROCEDURE FLvad_rx (
        acf_in : realACFType;               { Input }
        ltp_lags : integersubframeltptype;  { Input }
        FlbadQuality : BOOLEAN;             { Input }
        VAR  sp : BOOLEAN);                 { Output }

VAR
        vad   : BOOLEAN;
        sp1   : BOOLEAN;

BEGIN

IF NOT FLbadQuality THEN BEGIN
        FLvad_rx_1 (acf_in,ltp_lags,vad);

FLdtx_hand_rx_1 (vad,sp1);

FLstat_det_rx (acf_in[0],sp1,sp);

IF NOT use_stat_det THEN BEGIN
```

22
```
                sp := sp1;
            END;
            sp_old := sp;
        END ELSE BEGIN
            sp := sp_old;
        END;
    END;
END.

[INHERIT ('spd$def')]
MODULE as_actions_rx (input,output);

{ "Global" (for the module) variables }

VAR
        FLfilter_filter_state   : [STATIC] realArray10Type;
        FLfilter_filter_coeff   : [STATIC] REAL;
        FLfilter_filter_gain    : [STATIC] REAL;
        FLfilter_post_state     : [STATIC] realArray10Type;
        FLfilter_post_coeff     : [STATIC] REAL;
        FLfilter_post_gain      : [STATIC] REAL;
        FLfilter_my_state       : [STATIC] REAL;
        FLfilter_my_coeff       : [STATIC] REAL;
        FLfilter_my_gain        : [STATIC] REAL;

FLexpand_factor         : [STATIC] REAL;
        first_sp                : [STATIC] BOOLEAN;

{ External routines }

PROCEDURE stepdn_unstable_special_pas (
                    a          : realArray10Type;      { Input  }
                VAR rc         : RealArray10Type;      { Output }
                VAR unstable   : BOOLEAN);             { Output }
    EXTERNAL;
```

23

```
PROCEDURE stepdn_special_pas (
                a       : realArray10Type;    { Input }
            VAR rc      : RealArray10Type);   { Output }
EXTERNAL;

PROCEDURE FLpostCoeffCalculation(
        ZFLacfW                 : realACFType;
    VAR ZFLetaCurr              : realArray10Type );
EXTERNAL;

PROCEDURE FLcalculateACF(
        FLalphaCurr    : realArray10Type;
    VAR FLacfW         : realACFType );
EXTERNAL;

PROCEDURE FLcalculateautocorrfunction(
        FLalphaCurr    : realArray10Type;
    VAR FLacfW         : realACFType );
EXTERNAL;

[GLOBAL]
PROCEDURE FLas_actions_rx_init;
        { MUST be called first to initilize }
        { some things. }

VAR
        m   : INTEGER;

{ NOTE FLbw_exp is transferred as COMMON }

BEGIN

FOR m := 1 TO nrCoeff DO BEGIN
        FLfilter_filter_state[m] := 0;
        FLfilter_post_state[m] := 0;
    END;
```

```
                              24
    FLfilter_my_state := 0;
    first_sp := TRUE;

{ The following could be placed in ROM }

FLfilter_filter_coeff := EXP(-1.0/(4.0*50.0));
    FLfilter_my_coeff := EXP(-1.0/(0.25*50.0));
    FLfilter_post_coeff := FLfilter_my_coeff;

FLfilter_filter_gain := 1 - FLfilter_filter_coeff;
    FLfilter_post_gain := 1 - FLfilter_post_coeff;
    FLfilter_my_gain := 1 - FLfilter_my_coeff;

IF FLbw_exp >= 0 THEN BEGIN
          FLexpand_factor := EXP(-FLpi*FLbw_exp/8000.0);
    END ELSE BEGIN
          FLexpand_factor := 1;
    END;
    {FLexpand_factor := EXP(-FLpi*100.0/8000.0);}
    {FLexpand_factor := EXP(-FLpi*400.0/8000.0);} { ### }

{ ### }
    WRITELN('FLfilter_filter_coeff:',FLfilter_filter_coeff);
    WRITELN('FLfilter_filter_gain: ',FLfilter_filter_gain);
    WRITELN('FLfilter_my_coeff: ',FLfilter_my_coeff);
    WRITELN('FLfilter_my_gain: ',FLfilter_my_gain);
    WRITELN('FLfilter_post_coeff: ',FLfilter_post_coeff);
    WRITELN('FLfilter_post_gain: ',FLfilter_post_gain);

WRITELN('FLbw_exp: ',FLbw_exp);
    WRITELN('FLexpand_factor: ',FLexpand_factor);
    WRITELN('FLv_post: ',FLv_post);

{ ### }

END;
```

```
                                25
[GLOBAL]
PROCEDURE FLas_actions_rx (
           sp              : BOOLEAN;              { In     }
           FLa_in          : realArray10Type;      { In     }
           FLrc_in         : realArray10Type;      { In     }
           FLbadQuality    : BOOLEAN;              { In     }
    VAR    FLa_pres        : realArray10Type;      { Out    }
    VAR    FLrc_pres       : realArray10Type;      { Out    }
    VAR    FLa_post_pres   : realArray10Type;      { Out    }
    VAR    FLetacurr       : realArray10Type;      { In/Out }
      VAR  FLmy_use        : REAL);                { Out    }

VAR m          : INTEGER;
           FLdum      : REAL;
           FLRC_temp  : realArray10Type;
           unstable   : BOOLEAN;
           FLacfw     : realACFType;
           i_ab       : INTEGER;   { ### }
           eta_temp   : realArray10Type;   { ### }

BEGIN

FOR m := 1 TO nrCoeff DO BEGIN
              FLa_post_pres[m] := FLa_in[m] * FLnyweight[m];
        END;

IF sp THEN BEGIN

{FLfilter_my_state := FLfilter_my_coeff *
                                   FLfilter_my_state +
                         FLfilter_my_gain * FLmy;}   { ### }

FLmy_use := FLmy;
```

```
                        26
FOR m := 1 TO nrCoeff DO BEGIN
        FLa_pres[m] := FLa_in[m];
        FLrc_pres[m] := FLrc_in[m];
END;

IF first_sp THEN BEGIN
        FLdum := FLexpand_factor;
        FOR m := 1 TO nrCoeff DO BEGIN
                Flfilter_filter_state[m] :=
                    FLa_in[m] * FLdum;

FLfilter_post_state[m] :=
                    FLa_post_pres[m] * FLdum;

FLdum := FLdum * Flexpand_factor;
        END;
    END;
END ELSE BEGIN

IF NOT FLbadQuality THEN BEGIN
        FLfilter_my_state := FLfilter_my_coeff *
                                FLfilter_my_state +
                    FLfilter_my_gain * FLmy_off;
    END;

FLmy_use := FLfilter_my_state;

FLdum := FLexpand_factor;
    FOR m := 1 TO nrCoeff DO BEGIN
        IF NOT FLbadQuality THEN BEGIN
            FLfilter_filter_state[m] :=
                FLfilter_filter_state[m] *
                FLfilter_filter_coeff +
                FLfilter_filter_gain *
                FLa_in[m] * FLdum;

FLfilter_post_state[m] :=
```

```
                     27
           FLfilter_post_state[m] *
           FLfilter_post_coeff +
                   FLfilter_post_gain *
         FLa_post_pres[m] * FLdum;
    END;

FLa_pres[m] :=
       FLfilter_filter_state[m];

FLa_post_pres[m] :=
       FLfilter_post_state[m];

FLdum := FLdum * FLexpand_factor;
END;

{ Check for stability } stepdn_unstable_special_pas (
                            FLa_pres,     { In  }
                            FLRC_pres,    { Out }
                            unstable);    { Out }

IF unstable THEN BEGIN
WRITELN('Unstable a-parameter (as_actions_rx)');
     FOR m := 1 to nrCoeff DO BEGIN
          FLa_pres[m] := FLa_in[m];
          FLrc_pres[m] := FLrc_in[m];
     END;
END;

stepdn_unstable_special_pas (
                            FLa_post_pres, { In  }
                            FLRC_temp,     { Out }
                            unstable);     { Out }

IF unstable THEN BEGIN
WRITELN('Unstable post_filter (as_actions_rx)');
```

```
                                    28
                 FLdum := FLexpand_factor;
                 FOR m := 1 TO nrCoeff DO BEGIN
                     FLa_post_pres[m] := FLa_in[m] *
                                         FLnyweight[m]* Fldum;
                     FLdum := FLdum * FLexpand_factor;
                 END;
            END;

FLcalculateACF (
                           FLa_post_pres,
                           FLACFw);

{Flcalculateautocorrfunction (
                           FLa_pres,
                           FLACFw);}

FLpostCoeffCalculation (
                                   FLACFw,
                                   FLetaCurr);

END;

first_sp := (sp AND first_sp);
    END;
END.
```

We claim:

1. An apparatus in a receiver in a frame based radio communication system, for concealing transmission errors in a speech decoder caused by a communication channel, which speech decoder is of the source-filter type and is controlled by means including internal state variables updated on a frame by frame basis for modifying received filter parameters representing background sounds transmitted over said communication channel, said apparatus comprising:

(a) means for detecting frames containing transmission errors;

(b) means for deciding whether a frame in which transmission errors have been detected is acceptable;

(c) means for concealing said detected transmission errors by restricting updating of at least one of said internal state variables of said speech decoder if said detected frame is declared non-acceptable by said deciding means.

2. The apparatus of claim 1, wherein said filter parameter modifying means includes a voice activity detector with at least a threshold for speech/background sound decisions, said concealing means restricting updating of said threshold if said detected frame is declared non-acceptable by said deciding means.

3. The apparatus of claim 2, wherein said filter parameter modifying means further includes a stationarity detector connected to an output of said voice activity detector for discriminating between stationary and non-stationary background sounds, said stationarity detector including at least one buffer containing estimates of statistical moments of recent frames dominated by background sounds for making stationarity decisions, said concealing means restricting updating of said buffer if said detected frame is declared non-acceptable by said deciding means.

4. The apparatus of claim 2, wherein said filter parameter modifying means further includes a stationarity detector connected to an output of said voice activity detector for discriminating between stationary and non-stationary background sounds, said concealing means inhibiting updating of the stationarity/non-stationarity decision obtained from the previous frame if said detected frame is declared non-acceptable by said deciding means.

5. The apparatus of claim 2, wherein said filter parameter modifying means includes means for low pass filtering of the filter parameters, said concealing means restricting updating of filter coefficients of the low pass filtering process if said detected frame is declared non-acceptable by said deciding means.

6. The apparatus of claim 5, comprising a post filter for modifying the tilt of the spectrum of the decoded signal, said concealing means restricting updating of tilt information if said detected frame is declared non-acceptable by said deciding means.

7. The apparatus of claim 2, wherein said filter parameter modifying means includes means for bandwidth expansion of the filter represented by the filter parameters, said concealing means restricting updating of filter coefficients if said detected frame is declared non-acceptable by said deciding means.

8. The apparatus of claim 7, comprising a post filter for modifying the tilt of the spectrum of the decoded signal, said concealing means restricting updating of tilt information if said detected frame is declared non-acceptable by said deciding means.

9. The apparatus of claim 1, wherein said filter parameter modifying means includes a voice activity detector for performing speech/background sound decisions on a frame by frame basis, said concealing means inhibiting updating of the speech/background sound decision obtained from the previous frame if said detected frame is declared non-acceptable by said deciding means.

10. The apparatus of claim 9 wherein said filter parameter modifying means further includes a stationarity detector connected to an output of said voice activity detector for discriminating between stationary and non-stationary background sounds, said stationarity detector including at least one buffer containing estimates of statistical moments of recent flames dominated by background sounds for making stationarity decisions, said concealing means restricting updating of said buffer if said detected frame is declared non-acceptable by said deciding means.

11. The apparatus of claim 9, wherein said filter parameter modifying means further includes a stationarity detector connected to an output of said voice activity detector for discriminating between stationary and non-stationary background sounds, said concealing means inhibiting updating of the stationarity/non-stationarity decision obtained from the previous frame if said detected frame is declared non-acceptable by said deciding means.

12. The apparatus of claim 9, wherein said filter parameter modifying means includes means for low pass filtering of the filter parameters, said concealing means restricting updating of filter coefficients of the low pass filtering process if said detected flame is declared non-acceptable by said deciding means.

13. The apparatus of claim 9, wherein said filter parameter modifying means includes means for bandwidth expansion of the filter represented by the filter parameters, said concealing means restricting updating of filter coefficients if said detected flame is declared non-acceptable by said deciding means.

14. A method in a receiver in a frame based radio communication system, for concealing transmission errors in a speech decoder caused by a communication channel, which speech decoder is of the source-filter type and comprises means including internal state variables updated on a frame by frame basis for modifying received filter parameters representing background sounds transmitted over said communication channel, said method comprising:

(a) detecting frames containing transmission errors;

(b) deciding whether a frame in which transmission errors have been detected is acceptable;

(c) concealing said detected transmission errors by restricting updating of at least one of said internal state variables of said speech decoder if said detected frame is declared non-acceptable in said deciding step.

15. The method of claim 14, said filter parameter modifying means including a voice activity detector with at least a threshold for speech/background sound decisions, wherein said concealing step comprises restricting updating of said threshold if said detected frame is declared non-acceptable in said deciding step.

16. The method of claim 15, said parameter modifying means further including a stationarity detector connected to an output of said voice activity detector for discriminating between stationary and non-stationary background sounds, said stationarity detector including at least one buffer containing estimates of statistical moments of recent frames dominated by background sounds for making stationarity decisions, wherein said concealing step comprises restricting updating of said buffer if said detected frame is declared non-acceptable in said deciding step.

17. The method of claim 15, said filter parameter modifying means further including a stationarity detector connected to an output of said voice activity detector for discriminating between stationary and non-stationary background sounds, wherein said concealing step comprises inhibiting updating of the stationari- ty/non-stationarity decision obtained from the previous frame if said detected frame is declared non-acceptable in said deciding step.

18. The method of claim 15, said filter parameter modifying means including means for low pass filtering of the filter parameters, said method comprising restricting updating of filter coefficients of the low pass filtering process if said detected frame is declared non-acceptable in said deciding step.

19. The method of claim 15, said filter parameter modifying means including means for bandwidth expansion of the filter represented by these parameters, said method comprising restricting updating of filter coefficients if said detected frame is declared non-acceptable in said deciding step.

20. The method of claim 19, wherein the tilt of the spectrum of the decoded signal is modified by a post filter, said method comprising restricting updating of tilt information if said detected frame is declared non-acceptable in said deciding step.

21. The method of claim 18, wherein the tilt of the spectrum of the decoded signal is modified by a post filter, said method comprising restricting updating of tilt information if said detected frame is declared non-acceptable in said deciding step.

22. The method of claim 14, said filter parameter modifying means including a voice activity detector for performing speech/background sound decisions on a frame by frame basis, wherein said concealing step comprises inhibiting updating of the speech/background sound decision obtained from the previous frame if said detected frame is declared non-acceptable in said deciding step.

23. The method of claim 22, said filter parameter modifying means further including a stationarity detector connected to an output of said voice activity detector for discriminating between stationary and non-stationary background sounds, said stationarity detector including at least one buffer containing estimates of statistical moments of recent flames dominated by background sounds for making stationarity decisions, wherein said concealing step comprises restricting updating of said buffer if said detected flame is declared non-acceptable in said deciding step.

24. The method of claim 22, said filter parameter modifying means further including a stationarity detector connected to an output of said voice activity detector for discriminating between stationary and non-stationary background sounds, wherein said concealing step comprises inhibiting updating of the stationarity/non-stationarity decision obtained from the previous frame if said detected frame is declared non-acceptable in said deciding step.

25. The method of claim 22, said filter parameter modifying means including means for low pass filtering of the filter parameters, said method comprising restricting updating of filter coefficients of the low pass filtering process if said detected frame is declared non-acceptable in said deciding step.

26. The method of claim 11, said filter parameter modifying means including means for bandwidth expansion of the filter represented by these parameters, said method comprising restricting updating of filter coefficients if said detected frame is declared non-acceptable in said deciding step.

* * * * *